(No Model.)

J. W. McKINNON.
CARPET STRETCHER.

No. 272,295.  Patented Feb. 13, 1883.

WITNESSES:
William Miller
Otto Hufeland

INVENTOR
James W. McKinnon
BY Van Santvoord & Hauff
ATTORNEYS

N. PETERS, Photo-Lithographer, Washington, D. C.

UNITED STATES PATENT OFFICE.

JAMES W. McKINNON, OF NEW YORK, N. Y.

CARPET-STRETCHER.

SPECIFICATION forming part of Letters Patent No. 272,295, dated February 13, 1883.

Application filed January 4, 1883. (No model.)

*To all whom it may concern:*

Be it known that I, JAMES W. McKINNON, a subject of the Queen of Great Britain, residing at New York, in the county and State of New York, have invented new and useful Improvements in Carpet-Stretchers, of which the following is a specification.

This invention relates to a carpet-stretcher which serves to stretch the carpet gradually and to hold its end firmly in position for nailing. The peculiar construction of my device is pointed out in the following specification and illustrated in the accompanying drawings, in which—

Figure 1:
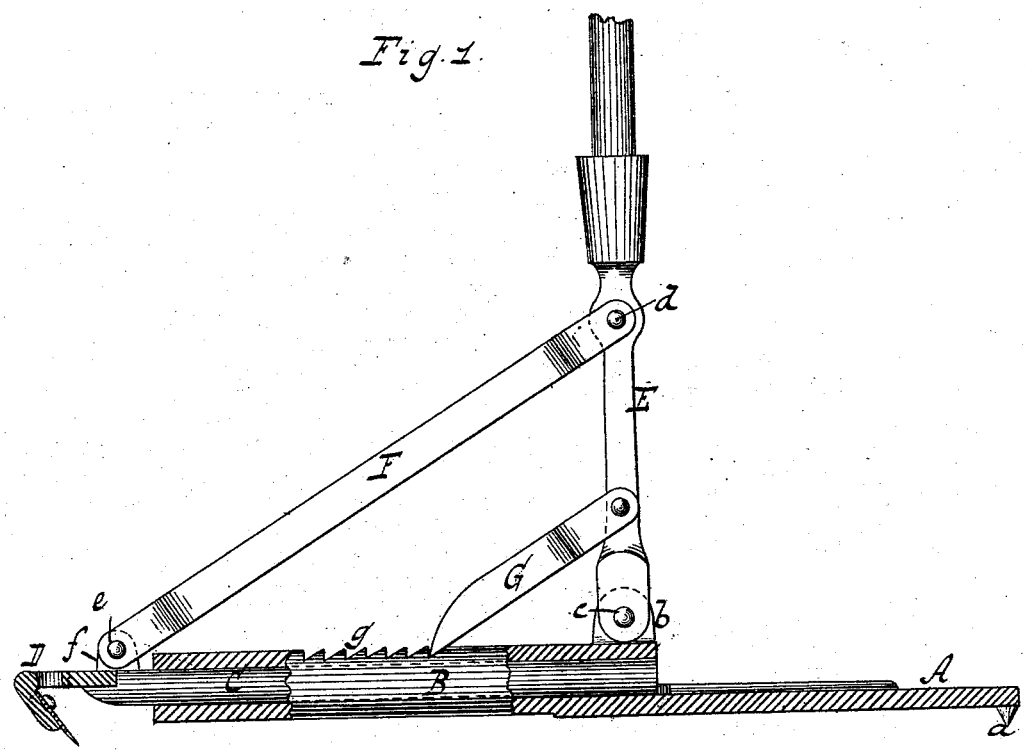
Figure 2:
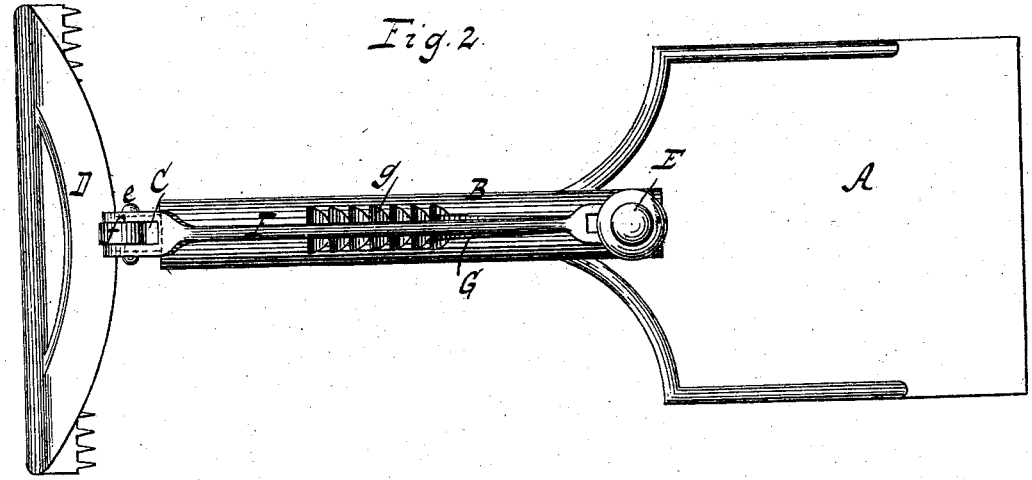

Figure 1 represents a sectional side view. Fig. 2 is a plan or top view.

Similar letters indicate corresponding parts.

In the drawings, the letter A designates a platform or foot-rest, which is by preference made of cast-iron, and provided at its outer surface with sharp-pointed projections $a$, so that the same, when depressed on the bare board of a floor, will take a firm hold and will not be liable to slip. From the front end of this foot-rest extends a tubular shank, B, which forms the guide for a rod, C, and to the outer end of this rod is firmly secured the rake D. The teeth of this rake are inclined toward the foot-rest, as shown in Fig. 1, and they are made of such a shape that they readily penetrate a carpet and take a firm hold of the same. From the tubular shank B, or from the foot-rest rises a lug, $b$, which fits into the bifurcated end of a hand-lever, E, and forms the bearings for the pivot $c$ on which said hand-lever oscillates. This hand-lever connects by a rod, F, with the rake D, said rod being attached at one end by a pivot, $d$, to the hand-lever, and at its opposite end by a pivot, $e$, to a lug, $f$, which rises from the rake-head, so that by moving the hand-lever the rake can be drawn in or out with considerable force. In the upper surface of the tubular shank B are formed ratchet-teeth $g$, and to the hand-lever E is pivoted a pawl, G, which engages with said ratchet-teeth and serves to retain the rake against the strain of the carpet.

In laying a carpet, I first nail down the carpet at one edge. Then I gradually stretch the same by placing the foot-rest A upon the floor, moving the rake out to its extreme position, causing the rake-teeth to engage with the carpet at the place where it is to be stretched, placing the foot partly upon and partly behind the foot-rest, and then drawing the hand-lever backward. When the carpet has been uniformly stretched throughout I place the foot-board A against the wall at the corner where the opposite edge of the carpet is to be fastened. I then move the rake out to its extreme position and cause the rake-teeth to penetrate the carpet, and by forcing the hand-lever back the edge of the carpet can be drawn close up to the corner, so that it can be conveniently tacked down close up to the foot-rest. Then the foot-rest is moved along and the operation is repeated until the carpet is secured along its entire edge. By means of the pawl G and ratchet-teeth $g$ the rake is retained in position against the strain of the carpet, so that the hand-lever can be released and the carpet can be stretched and tacked down without difficulty by one man.

What I claim as new, and desire to secure by Letters Patent, is—

1. The combination, substantially as hereinbefore described, of the foot-rest, the tubular shank extending from this foot-rest, the hand-lever pivoted to the tubular shank extending from this foot-rest, the rod fitted into the tubular shank, the rake secured to the front end of this rod, and the rod connecting the hand-lever and the rake.

2. The combination, substantially as hereinbefore described, of the foot-rest, the tubular shank extending from this foot-rest, the hand-lever pivoted to the tubular shank, or to the foot-rest, the rod fitted into the tubular shank, the rake secured to the front end of this rod, the rod connecting the hand-lever and the rake, the ratchet-teeth formed in the tubular shank, and the pawl connected to the hand-lever and engaging with said ratchet-teeth.

In testimony whereof I have hereunto set my hand and seal in the presence of two subscribing witnesses.

JAMES W. McKINNON. [L. S.]

Witnesses:
W. HAUFF,
E. F. KASTENHUBER.